United States Patent
Liu et al.

(10) Patent No.: US 12,317,137 B2
(45) Date of Patent: May 27, 2025

(54) METHOD FOR SERVICE SWITCHING BETWEEN BROADCAST SERVICE AND UNICAST SERVICE, TERMINAL, AND NETWORK DEVICE

(71) Applicant: InterDigital Patent Holdings, Inc., Wilmington, DE (US)

(72) Inventors: Jianhua Liu, Dongguan (CN); Qianxi Lu, Dongguan (CN); Haorui Yang, Dongguan (CN); Shukun Wang, Guangdong (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 281 days.

(21) Appl. No.: 17/852,257

(22) Filed: Jun. 28, 2022

(65) Prior Publication Data
US 2022/0330100 A1    Oct. 13, 2022

Related U.S. Application Data

(63) Continuation of application No. PCT/CN2020/070537, filed on Jan. 6, 2020.

(51) Int. Cl.
*H04W 36/00* (2009.01)
*H04W 36/32* (2009.01)
*H04W 76/30* (2018.01)

(52) U.S. Cl.
CPC ..... *H04W 36/0007* (2018.08); *H04W 36/326* (2023.05); *H04W 76/30* (2018.02)

(58) Field of Classification Search
CPC ............. H04W 36/0007; H04W 76/30; H04W 36/326

USPC .......................................................... 370/331
See application file for complete search history.

(56) References Cited

U.S. PATENT DOCUMENTS

| | | |
|---|---|---|
| 2013/0294320 A1 | 11/2013 | Jactat |
| 2016/0211980 A1* | 7/2016 | Zhu ....................... H04W 72/30 |
| 2016/0308684 A1 | 10/2016 | Zhu |
| 2016/0374050 A1 | 12/2016 | Prasad et al. |
| 2019/0166580 A1 | 5/2019 | Prasad et al. |
| 2020/0036542 A1 | 1/2020 | Zhu et al. |
| 2021/0058748 A1* | 2/2021 | Liao ....................... H04W 76/11 |

(Continued)

FOREIGN PATENT DOCUMENTS

| | | |
|---|---|---|
| CN | 101242581 A | 8/2008 |
| CN | 102036182 A | 4/2011 |

(Continued)

OTHER PUBLICATIONS

International Search Report in the international application No. PCT/CN2020/070537, mailed on Sep. 27, 2020.
(Continued)

*Primary Examiner* — Christopher B Robinson
*Assistant Examiner* — Chong G Kim
(74) *Attorney, Agent, or Firm* — Volpe Koenig

(57) ABSTRACT

Disclosed are a service switching method, a terminal and a network device. The method comprises: when a terminal receives data of a first service, if the terminal determines that a present condition is satisfied, then the terminal switches to receiving data of a second service. The preset condition comprises: the condition of the terminal stopping the first service, and/or the condition of receiving the data of the second service.

15 Claims, 4 Drawing Sheets

(56) References Cited

U.S. PATENT DOCUMENTS

| | | | |
|---|---|---|---|
| 2021/0112379 A1* | 4/2021 | Ge | H04W 76/11 |
| 2022/0322202 A1* | 10/2022 | Li | H04M 15/93 |
| 2022/0417825 A1* | 12/2022 | Youn | H04W 76/11 |
| 2024/0365178 A1* | 10/2024 | Li | H04W 36/0007 |

FOREIGN PATENT DOCUMENTS

| | | |
|---|---|---|
| CN | 108541029 A | 9/2018 |
| CN | 110139240 A | 8/2019 |
| EP | 2638714 A1 | 9/2013 |
| WO | 2021138780 A1 | 7/2021 |

OTHER PUBLICATIONS

Written Opinion of the International Search Authority in the international application No. PCT/CN2020/070537, mailed on Sep. 27, 2020.

Supplementary European Search Report in the corresponding European patent application No. 20911888.4, mailed on Feb. 28, 2023.

Huawei et al.: "Service continuity for group communication over eMBMS", 3GPP Draft; R2-140261 Service Continuity for Groupcommunication Over EMBMS, 3rd Generation Partnership Project (3GPP), Mobile Competence Centre ; 650, Route Des Lucioles ; F-06921 Sophia-Antipolis CE vol. RAN WG2, No. Prague, Czech Republic; Feb. 10, 2014-Feb. 14, 2014, Feb. 9, 2014 (Feb. 9, 2014), XP050791659, all pages.

Ericsson: "Policy Framework for 5G", 3GPP Draft; S2-175392_23.203_Moving Policy Framework Into Normative, 3rd Generation Partnership Project (3GPP), Mobile Competence Centre ; 650, Route Des Lucioles ;F-06921 Sophia-Antipolis Cedex; FR vol. SA WG2, No. Sophia Antipolis, France; Aug. 21, 2017-Aug. 25, 2017, Aug. 21, 2017 (Aug. 21, 2017), XP051325245, Retrieved from the Internet:URL:http://www.3gpp.org/ftp/Meetings_3GPP_SYNC/SA2/Docs/[retrieved on Aug. 21, 2017], all pages.

"3rd Generation Partnership Project; Technical Specification Group Services and System Aspects, Procedures for the 5G System (5GS);Stage 2, (Release 15)", 3GPP TS 23.502 V15.8.0 (Dec. 2019).

\* cited by examiner

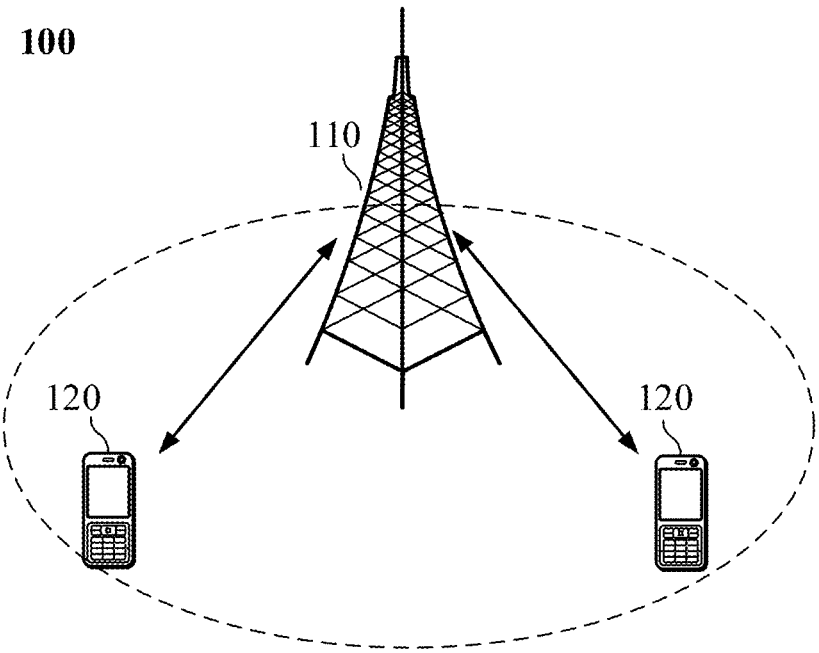

When a terminal receives data of a first service, the terminal switches to receive data of a second service responsive to determining that a preset condition is met  /211

A network device transmits data of a first service to a terminal device  /221

When the terminal device switches from the first service to a second service, the network device transmits data of the second service to the terminal device  /222

FIG. 2B

METHOD FOR SERVICE SWITCHING BETWEEN BROADCAST SERVICE AND UNICAST SERVICE, TERMINAL, AND NETWORK DEVICE

CROSS-REFERENCE TO RELATED APPLICATION

This is a continuation of International Application No. PCT/CN2020/070537 filed on Jan. 6, 2020, the contents of which are incorporated herein by reference in its entirety.

TECHNICAL FIELD

The present disclosure relates to the technical field of information processing, and more particular, to a method for service switching, a terminal, a network device, a chip, a computer readable storage medium, a computer program product, and a computer program.

BACKGROUND

In a 5G system, a broadcast transmission mechanism will be introduced. In the transmission mechanism, a network device transmits downlink data in a point-to-multipoint transmission mode within an area of a broadcast service. A terminal in the area of the broadcast service may receive broadcast data using a broadcast channel.

However, in some specific scenarios in the 5G system, the terminal may move out of the broadcast area, for example, the terminal moves to a position of a base station that does not support broadcasting. In order to ensure continuity of the terminal service, it is necessary to consider a processing manner of switching the broadcast service to a unicast service; or conversely, when the terminal moves from a base station that does not support the broadcast service to a base station that supports the broadcast service, it is necessary to consider a processing manner of switching a unicast connection to a broadcast connection.

SUMMARY

To solve the above technical problems, embodiments of the present disclosure provide a method for service switching, a terminal, a network device, a chip, a computer readable storage medium, a computer program product, and a computer program.

According to a first aspect, a method for service switching is provided, which includes the following operations.

When a terminal receives data of a first service, the terminal switches to receive data of a second service responsive to determining that a preset condition is met.

The preset condition includes at least one of: a condition for the terminal to stop the first service, or a condition for the terminal to receive the data of the second service.

According to a second aspect, a terminal is provided, which includes a first communication unit.

The first communication unit is configured to switch, when data of a first service is received, to receive data of a second service through the terminal responsive to determining that a preset condition is met.

The preset condition includes at least one of: a condition for the terminal to stop the first service, or a condition for the terminal to receive the data of the second service.

According to a third aspect, a method for service switching is provided, which includes the following operations.

The network device transmits data of a first service to a terminal device.

When the terminal device switches from the first service to a second service, the network device transmits data of the second service to the terminal device.

According to a fourth aspect, a network device is provided, which includes a second communication unit.

The second communication unit is configured to transmit data of a first service to a terminal device, and transmit data of a second service to the terminal device when the terminal device switches from the first service to the second service.

According to a fifth aspect, a terminal is provided, which includes a processor and a memory. The memory is configured to store a computer program, and the processor is configured to call and run the computer program stored in the memory to execute the method in the above first aspect or various implementations thereof.

According to a sixth aspect, a network device is provided, which includes a processor and a memory. The memory is configured to store a computer program, and the processor is configured to call and run the computer program stored in the memory to execute the method in the above third aspect or various implementations thereof.

According to a seventh aspect, a chip is provided, which is configured to implement the method in the above first to third aspect or various implementations thereof.

Specifically, the chip includes a processor. The processor is configured to call a computer program from a memory and run the computer program, to cause a device mounted with the chip to execute the method of any one of the above first aspect to third aspect, seventh aspect to tenth aspect or various implementations thereof.

According to an eighth aspect, a computer readable storage medium is provided. The computer readable storage medium is configured to store a computer program that causes a computer to execute the method of the above first to third aspects or various implementations thereof.

According to a ninth aspect, a computer program product is provided, which includes a computer program instruction. The computer program instruction causes a computer to execute the method of the above first to third aspects or various implementations thereof.

According to a tenth aspect, a computer program is provided. The computer program, when running on a computer, causes the computer to execute the method of the above first to third aspects or various implementations thereof.

With the above solutions, the terminal service is able to switch from the present first service to the second service in combination with the situation of the terminal device. Therefore, the terminal may realize switching between services when a certain condition is met, thereby ensuring the continuity of services on the terminal side.

BRIEF DESCRIPTION OF THE DRAWINGS

FIG. 1 is a schematic structure diagram of a communication architecture.

FIG. 2A is a first schematic flowchart of a method for service switching according to an embodiment of the present disclosure.

FIG. 2B is a second schematic flowchart of a method for service switching according to an embodiment of the present disclosure.

DETAILED DESCRIPTION

Figure 3:
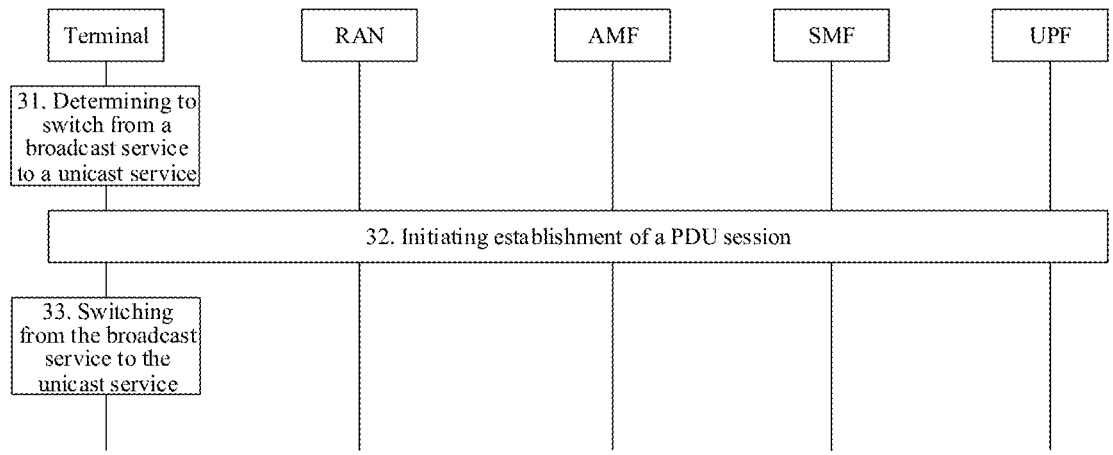
FIG. 3 is an example flowchart of a method for service switching according to an embodiment of the present disclosure.

In order to make the characteristics and technical contents of the embodiments of the disclosure understood in more detail, the implementation of the embodiments of the disclosure will be described below in combination with the drawings in detail. The appended drawings are only adopted for description as references and not intended to limit the embodiments of the disclosure.

The technical solutions in the embodiments of the present disclosure will be described with reference to the accompanying drawings of the embodiments of the present disclosure. It is apparent that the described embodiments are a part of the embodiments, not all of the embodiments. Based on the embodiments in the present disclosure, all other embodiments obtained by a person skilled in the art without creative effort fall within the protection scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, a 5G system and the like.

In one example, a communication system 100 to which the embodiments of the present disclosure is applied may be illustrated in FIG. 1. The communication system 100 may include a network device 110, which may be a device communicating with a UE 120 (also referred to as a communication terminal, terminal). The network device 110 may provide communication coverage for a specific geographic area and may communicate with a UE located within the coverage area. In one example, the network device 110 may be a Base Transceiver Station (BTS) in a GSM system or a CDMA system, a NodeB (NB) in a WCDMA system, an evolved Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN), and the like.

The communication system 100 also includes at least one UE 120 located within the coverage of the network device 110. The "UE" used herein includes but is not limited to connection via wired lines, such as Public Switched Telephone Networks (PSTN), Digital Subscriber Line (DSL), digital cables, direct cable connections; and/or another data connection/network; and/or via a wireless interface, such as for a cellular network, a Wireless Local Area Network (WLAN), a digital television network such as DVB-H network, a satellite network, a AM-FM broadcast transmitter; and/or means of another UE arranged to receive/transmit communication signals; and/or Internet of Things (IoT) devices. A UE configured to communicate via a wireless interface may be referred to as a "wireless communication terminal", "wireless terminal" or "mobile terminal".

In one example, Device to Device (D2D) communication may be performed between the UEs 120.

It is to be understood that terms "system" and "network" are used interchangeably herein. Term "and/or" as used herein is merely an association relationship describing associated object and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to make the characteristics and technical contents of the embodiments of the disclosure understood in more detail, the implementation of the embodiments of the disclosure will be described below in combination with the drawings in detail. The appended drawings are only adopted for description as references and not intended to limit the embodiments of the disclosure.

An embodiment of the present disclosure provides a method for service switching. As illustrated in FIG. 2A, the method includes the following operations.

In 211, when a terminal receives data of a first service, the terminal switches to receive data of a second service responsive to determining that a preset condition is met.

The preset condition includes: a condition for the terminal to stop the first service, and/or a condition for the terminal to receive the data of the second service.

An embodiment of the present disclosure provides a method for service switching. As illustrated in FIG. 2B, the method includes the following operations.

In 221, a network device transmits data of a first service to a terminal device.

In 222, when the terminal device switches from the first service to a second service, the network device transmits data of the second service to the terminal device.

The present embodiment may be applied to a 5G system. Specifically, the terminal may be a terminal device in a 5G network, or may be a terminal supporting 5G. The network device may be a core network device, a RAN node, or the like.

The solutions provided by the embodiments are described in detail below in two examples.

First Example

The abovementioned first service is a broadcast service, and the second service is a unicast service. Accordingly, this situation is mainly for a processing of switching from a broadcast mode to a unicast mode. With reference to FIG. 3, the following is described in detail.

In the present example, the terminal receives the data of the first service, which may be understood as that the terminal is receiving the broadcast service, or the terminal is receiving downlink data of the broadcast service.

In 31, the terminal determines to switch from the broadcast service to the unicast service based on a preset condition.

In the present example, the preset condition mainly includes a condition for the terminal to stop the first service.

Specifically, in the present example, the preset condition includes at least one of: the terminal detects moving out of a coverage area of the broadcast service; the terminal detects moving out of a coverage area of the broadcast service after a first duration; or the terminal receives notification information that the broadcast service is stopped after a second duration.

The manner in which the terminal detects moving out of the coverage area of the broadcast service may include at least one of the following.

It is determined that the terminal moves out of the coverage area of the broadcast service when the terminal detects that signal intensity of the channel of the broadcast service is lower than a preset first threshold.

It is determined that the terminal moves out of the coverage area of the broadcast service when the terminal detects that reception block error ratio on the broadcast channel corresponding to the broadcast service is greater than a preset second threshold.

The terminal enters a coverage area of a first cell that does not support the broadcast service.

In other words, if the terminal detects that the signal intensity of the broadcast channel is lower than the preconfigured first threshold or the reception block error ratio of the terminal on the broadcast channel is greater than the preconfigured second threshold, the terminal may consider that the terminal detects moving out of the coverage area of the broadcast service, that is, the preset condition is met.

In addition, it may be determined through a system message of the above first cell whether the first cell supports the broadcast information. The system message of the first cell may be carried in an SIB (System Information Block) and a MIB (Master Information Block).

Further, the terminal enters a coverage area of the first cell and receives a system message from a base station of the first cell (or other network devices). The terminal extracts related information of a service supported by the first cell from the system message, and the terminal determines whether the first cell supports the original broadcast service based on the related information of the service supported by the first cell. When it is determined that the original broadcast service is supported, no processing is performed, and when it is determined that the original broadcast service is not supported, it may be determined that the terminal detects moving out of the coverage area of the broadcast service, that is, the above preset condition is met.

The related information of the service may include an identifier of the service, a type of the service, and the like. Further, the terminal may determine according to the service identifier whether the service supported by the first cell is the broadcast service presently in use; and/or, the terminal may determine according to the service type whether the service supported by the first cell is the broadcast service, and then may determine whether the first cell supports the original broadcast service.

The manner in which the terminal detects moving out of the coverage area of the broadcast service after the first duration may include the following.

The terminal receives a system message of a cell where the terminal is presently located, and determines that a neighboring cell to be entered by the terminal after the first duration does not support the broadcast service.

That is, the terminal receives the system message in the present cell, and may acquire related information of a service corresponding to at least one neighboring cell through the MIB or SIB.

The terminal determines a neighboring cell to be entered within the first duration according to self-movement information of the terminal.

It is determined whether the neighboring cell to be entered by the terminal supports the present broadcast service in combination with related information of the service corresponding to the neighboring cell to be entered. When the present broadcast service is supported, the preset condition is not met and no processing is performed; and when the present broadcast service is not supported, the terminal detects moving out of the coverage area of the broadcast service after the first duration, that is, the preset condition is met.

The first duration may be set according to the actual situation, which may be set relatively short. That is, the terminal only determines the upcoming situation, and does not determine the situation after a long time in the future, for example, the first duration may be 5s, or 10s, or may be shorter, for example, 50 ms, etc., which is not exhaustive herein.

The description on the related information of the service is the same as that described above, and is not described in detail. Accordingly, the self-movement information of the terminal may make the terminal to pre-determine a neighboring cell to be accessed by the terminal within the first duration according to a present movement speed, movement direction, and the like.

The condition that the terminal receives notification information for indicating the broadcast service is stopped after the second duration may be specifically as follows.

The terminal receives notification information for indicating the broadcast service is stopped after the second duration from a Radio Access Network (RAN) node. Correspondingly, the network device transmits to the terminal device notification information for indicating the broadcast service is stopped. The network device may be the RAN node.

The notification information from the RAN node may include notification information that the broadcast service is stopped after the second duration. The notification information is transmitted on a broadcast control channel, or is carried by a paging message, or is carried by a dedicated signaling.

It is to be noted that the second duration may be set to be short, that is, the RAN only initiates the notification information for the terminal within a short period of time before the broadcast service is about to stop.

It is also to be understood that the above preset condition is also applicable to multicast service detection, that is, a condition for detection of a multicast service in the group by the terminal.

Based on the abovementioned detection, the terminal may determine to switch from reception of data of the first service (the broadcast service in the example) to reception of data of the second service (the unicast service in the example). Correspondingly, in 32 illustrated in FIG. 3, the terminal initiates establishment of a Protocol Data Unit (PDU) session based on related information of a PDU session to be established for the unicast service.

Specifically, the operation that the terminal determines the related information of the PDU session to be established for the unicast service may include the following manners.

In the first manner, a Non Access Stratum (NAS) of the terminal determines related information of the PDU session to be established according to first indication information of an Access Stratum (AS) and information of a preconfigured UE Route Selection Policy (URSP). The PDU session is a PDU session of the unicast service.

Specifically, the NAS of the terminal determines the PDU session connection to be established according to the first indication information of the AS.

The first indication information includes at least one of: service information corresponding to the unicast service, group information to which the unicast service belongs, or slice information corresponding to the unicast service. That is, the first indication information of the AS includes at least one of: broadcast service information, group information to which the unicast service belongs, or slice information.

Accordingly, the NAS of the terminal determines the related information of the PDU session for the unicast service to be established according to the first indication information of the AS and the information of the preconfigured URSP.

The related information of the PDU session includes at least one of: Data Network Name (DNN) information, group information, slice information or the like.

In the second manner, an NAS of the terminal determines related information of a PDU session to be established according to second indication information of an application layer and information of a preconfigured URSP. The PDU session is a PDU session of the unicast service. The second indication information is used to trigger the NAS to establish the PDU session.

The application layer of the terminal acquires the third indication information of the AS.

The third indication information is used to indicate that the broadcast service has stopped or is to stop.

For example, it may be a shorter time, 10 ms or the like. That is, the AS of the terminal indicates to the application layer that the broadcast service is to stop or that the service of the present specific group is to stop.

The application layer of the terminal triggers the NAS layer to establish the PDU session according to the indication information of the AS. Then, the application layer of the terminal transmits the service information that needs to establish the PDU session to the NAS, which may include, for example, service information, IP information, group information or the like. Correspondingly, the NAS of the terminal determines the related information of the PDU session to be established according to the URSP information.

It is to be noted that initiating of establishment of the PDU session illustrated in FIG. 3 requires the cooperation of the network side device, such as the RAN, Access and Mobility Management Function (AMF), Session Management Function (SMF), User Plane Function (UPF) and other entities in FIG. 3. Of course, FIG. 3 is only an example, and the flow of establishing the PDU session of the unicast service is not limited in the example.

Further, based on the above description, in 33, when the terminal receives Data Radio Bearer (DRB) configuration of the PDU session, the terminal stops reception of the broadcast service. Correspondingly, the network device receives information that reception of the broadcast service is stopped from the terminal device.

In addition, the terminal also establishes a connection of the unicast service based on the related information of the PDU session. The terminal switches from the broadcast service to the unicast service, and performs subsequent unicast service processing through the unicast service.

A transmission mode of the unicast is briefly described as follows.

The 5G core (5GC) supports the PDU connection service, which is a service of exchanging PDU data packets between a UE and a DN. The PDU connection service is implemented by establishment of the PDU session initiated by the UE. After one PDU session is established, that is, a data transmission channel between the UE and the DN is established.

Subscription information of each Single Network Slice Selection Assistance Information (S-NSSAI) may include one default DNN and multiple DNNs. When the UE initiates the PDU Session Establishment Request without providing a DNN of the S-NSSAI, the serving AMF may select the default DNN for the S-NSSAI if the subscription information of the UE has the default DNN. If there is no default DNN, the serving AMF may select the locally configured DNN for the S-NSSAI. When the DNN carried in the PDU Session Establishment Request message by the UE is not supported by the network, and the AMF fails to select one suitable SMF through querying the NF Repository Function (NRF), the AMF may reject the PDU connection request and carry the cause value "DNN is not supported".

Each PDU session supports one PDU session type, i.e., one of IPv4, IPv6, IPv4v6, Ethernet and Unstructured.

The PDU session is established, modified and released between the terminal and the SMF entity through an NAS SM signaling.

Second Example

The present example is different from the above first example in that the first service is the unicast service and the second service is the broadcast service in the present example. Further, the broadcast service in the present example may be a broadcast service that is being transmitted using a unicast bearer. That is, the present example is directed to a unicast-to-broadcast switching procedure and a processing of a service switching in which a terminal moves to the coverage area of the broadcast.

Figure 4:
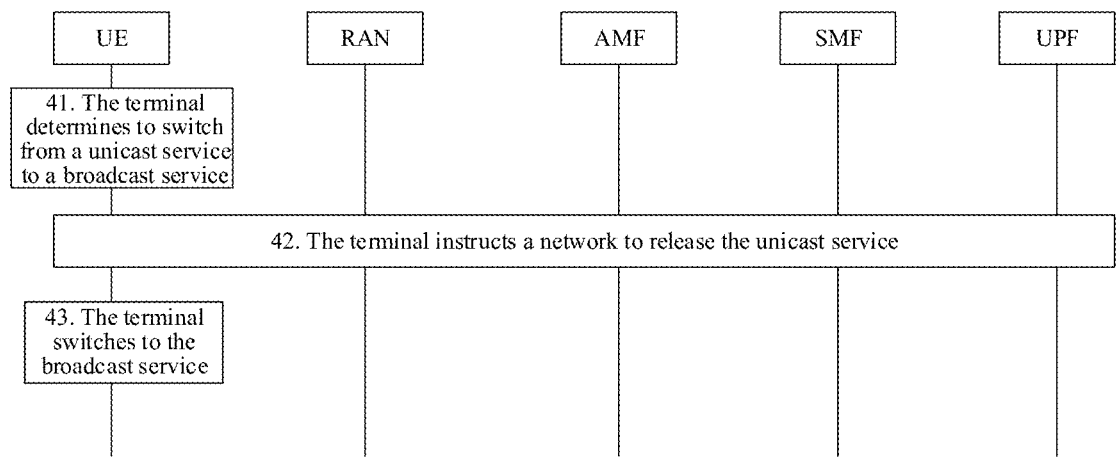
FIG. 4 is another example flowchart of a method for service switching according to an embodiment of the present disclosure.

In the present embodiment, the terminal transmits one or more services through the unicast in an area without broadcast coverage, and when the terminal detects that the broadcast service exists, the terminal notifies the network to release the corresponding unicast connection. The present example will be described in detail with reference to FIG. 4.

In 41, when the terminal detects the broadcast service, it is determined that the preset condition is met, or when the terminal further determines that the detected broadcast service is being transmitted using the unicast bearer, the preset condition is met. Then, the terminal determines to switch from the unicast service to the broadcast service. That is, in the present example, the preset condition includes that presence of the broadcast service is detected by the terminal.

Specifically, in the first manner, the preset condition specifically includes at least one of the following.

The access stratum of the terminal detects that the signal intensity of the broadcast channel related to the unicast service is higher than a preconfigured third threshold.

The access stratum of the terminal detects that the reception block error ratio of the broadcast channel related to the unicast service is lower than a configured fourth threshold.

The terminal receives system information that supports the broadcast service related to the unicast service.

The terminal is capable of receiving data on the broadcast channel.

The third threshold and the fourth threshold may be set according to the actual condition, and are not limited herein.

The condition that the terminal is capable of receiving data on the broadcast channel means that the terminal device is capable of receiving data of the broadcast service on the broadcast channel of the broadcast service related to the unicast service.

It is to be noted herein that the NAS of the terminal may instruct the AS to monitor the broadcast service. That is, the AS of the terminal monitors the broadcast service according to an indication of the NAS.

Further, information of the broadcast service that needs to be acquired for monitoring the broadcast service may be acquired through the following manners.

The access stratum of the terminal receives information of the broadcast service corresponding to a bearer of the unicast service from the Non Access Stratum (NAS) during a bearer establishment procedure of the unicast service.

Alternatively, the AS of the terminal acquires information of the broadcast service corresponding to the unicast service from a configuration message on the network side. The configuration message on the network side may also be acquired by the AS of the terminal during the bearer establishment procedure of the unicast service, or may be preconfigured, or may be acquired from other processing procedures, which is not exhaustive herein.

Specifically, the abovementioned unicast service may be understood as related information corresponding to the unicast service. For example, the unicast service is: a bearer corresponding to the unicast service; or, a PDU session corresponding to the unicast service; or, Quality of Service (QoS) data flow corresponding to the unicast service.

In the second manner, the access stratum of the terminal detects any broadcast service according to at least one of the above preset conditions.

In 42, after detecting the related broadcast service, the terminal instructs the network to release or deactivate the unicast service.

Specifically, in Manner A, the NAS of the terminal initiates, according to fourth indication information of an AS, a processing of releasing or deactivating a PDU session connection corresponding to the unicast service to a core network, or, requests to delete QoS data flow corresponding to the unicast service.

The fourth indication information is used to instruct to: release or deactivate the PDU session corresponding to the unicast service, or, detect related information of the broadcast service, or, delete the QoS data flow corresponding to the unicast service.

Specifically, according to the first manner for the operation in 41, the fourth indication information includes at least one of: indication information for stopping the unicast service; or, indication information that the broadcast service corresponding to the unicast service is detected, and the indication information is used to indicate PDU session identification information of the corresponding unicast service or service identification information of the unicast service.

Accordingly, when the fourth indication information includes the service identification information, the NAS of the terminal determines the PDU session required to be released or deactivated according to the service identification information and information of the preconfigured URSP.

The indication for stopping the unicast service may be understood as including an indication for releasing or deactivating the PDU session connection corresponding to the unicast service, or including an indication for deleting the QoS data flow corresponding to the unicast service.

According to the second manner for the operation in 41, the fourth indication information is related information of the monitored broadcast service. The related information of the broadcast service includes at least one of group information to which the broadcast service belongs or slice information.

Correspondingly, the NAS of the terminal determines the PDU session that needs to be released or deactivated according to the above information and the information in the URSP.

Specifically, the NAS initiates a procedure of releasing or deactivating the PDU session to the core network. Correspondingly, the core network device notifies, according to the processing of releasing or deactivating the PDU session connection corresponding to the unicast service or request of deleting QoS data flow corresponding to the unicast service initiated by the NAS of the terminal, a RAN node to release or deactivate the PDU session connection corresponding to the unicast service, or, delete the QoS data flow corresponding to the unicast service.

The operation that the core network device notifies the RAN node to release or deactivate the PDU session connection corresponding to the unicast service includes the following action.

The core network device notifies the RAN node to release or deactivate Access Network (AN) resources and context information of the PDU session connection corresponding to the unicast service.

It is to be noted that the AS of the terminal monitors the related information of the broadcast service corresponding to the unicast service according to the indication of the NAS. Specifically, the unicast service is mainly directed to the PDU session of the unicast service. That is, during the bearer establishment procedure of the unicast service, the AS of the terminal detects the broadcast service corresponding to the unicast service according to the indication of the NAS and acquires the related information corresponding to the broadcast service.

In Manner B, the NAS of the terminal initiates a processing of releasing or deactivating a PDU session connection corresponding to the unicast service to the core network according to fifth indication information of the application layer. The fifth indication information is used to indicate related information of the broadcast service.

Specifically, the AS of the terminal indicates the service information corresponding to the monitored broadcast service to the application layer, the application layer of the terminal triggers the NAS according to the indication information of the AS, and the NAS confirms information of the PDU session that needs to be released or deactivated according to the service information indicated by the application layer and the URSP information. The NAS initiates a procedure of releasing or deactivating the PDU session to the core network device.

Correspondingly, the core network device notifies, according the processing of releasing or deactivating the PDU session connection corresponding to the unicast service initiated by the NAS of the terminal, the RAN node to release the PDU session connection corresponding to the unicast service.

The operation that the core network device notifies the RAN node to release the PDU session connection corresponding to the unicast service includes the following action.

The core network device notifies the RAN node to release AN resources and context information of the PDU session connection corresponding to the unicast service.

In Manner C, the AS of the terminal transmits sixth indication information to a radio access network (RAN) node.

The sixth indication information includes one of: DRB information corresponding to a unicast service requested to be released, PDU session information corresponding to a unicast service requested to be released or deactivated, or QoS data flow information corresponding to a unicast service requested to be deleted.

The sixth indication information transmitted by the AS of the terminal to the RAN may specifically be the DRB information requested to be released, the PDU session information, or service information of the monitored broadcast channel. After receiving the sixth indication information from the terminal, the RAN releases the DRB and related configuration corresponding to the requested DRB or PDU session. The following operation may be included that the RAN node releases or deactivates the PDU session information corresponding to the unicast service according to the sixth indication information, or deletes information of the QoS data flow corresponding to the unicast service according to the sixth indication information.

Specifically, when the network device is a RAN node, the method further includes the following operation.

The RAN node receives the sixth indication information from the terminal.

When the sixth indication information includes DRB information corresponding to a unicast service requested to be released, or PDU session information corresponding to a unicast service requested to be released or deactivated, or QoS data flow information corresponding to a unicast service requested to be deleted, the method further includes the following operation. The DRB and related configuration corresponding to the requested DRB or PDU session is released, which may include that the related configuration of the PDU session corresponding to the requested unicast service is released or deactivated, or the related configuration of the QoS data flow corresponding to the unicast service is deleted.

And/or, when the sixth indication information includes related information of a detected broadcast service or information of a detected broadcast service in which a unicast bearer exists, the method further includes the following operation. The RAN node releases a DRB and related configuration corresponding to the unicast service. That is, when the terminal indicates information of a service, the RAN releases the DRB and related configuration corresponding to the service.

And/or, when the sixth indication information includes a measurement result of a broadcast channel corresponding to a detected broadcast service, the method further includes the following operation. The RAN node determines, according to the measurement result, whether to release a unicast bearer. That is, the terminal may report the result of the detected broadcast channel to the RAN, and correspondingly, the RAN determines whether to release the unicast bearer according to the result. For example, when the measurement result indicates that quality of the present unicast service exceeds a preset quality threshold (for example, SIRN is higher than the corresponding threshold), the bearer corresponding to the unicast service may not be released; otherwise, it may be determined to release the bearer corresponding to the unicast service, and then the bearer of the broadcast service corresponding to the unicast service is established.

In addition, during a bearer establishment procedure of the unicast service, the RAN node further receives broadcast service information corresponding to an indication from the core network.

In 43, the terminal switches from the unicast service to the broadcast service. Then, the terminal establishes the broadcast service.

Figure 5:
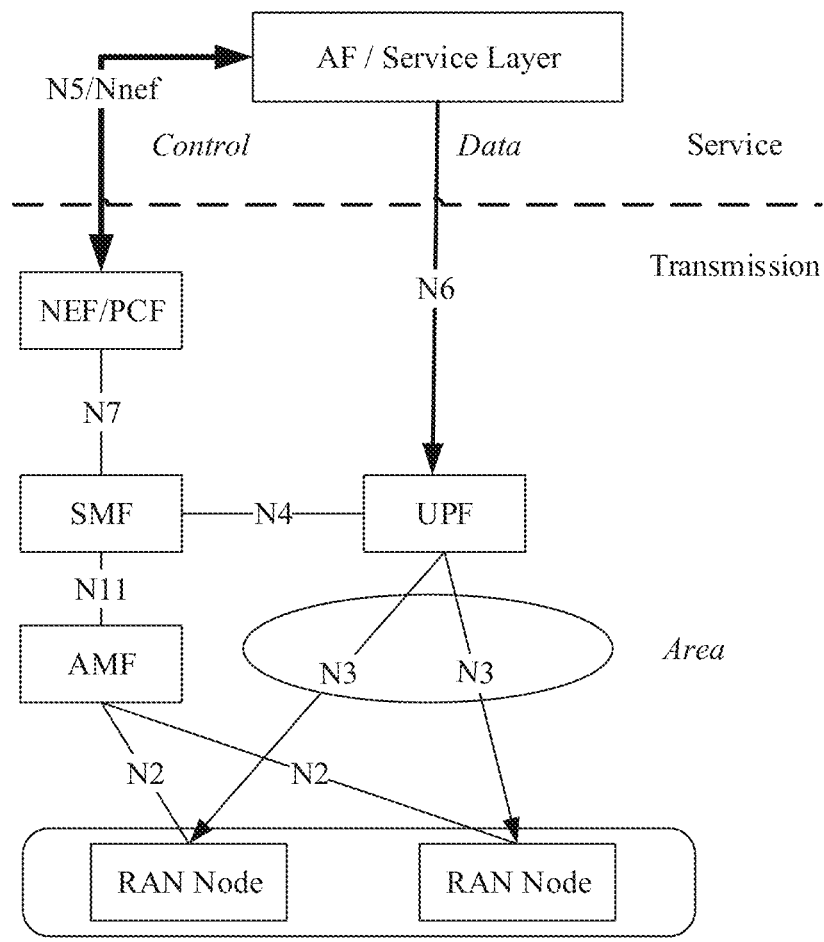
FIG. 5 is a schematic diagram of a system architecture of a broadcast service.

As illustrated in FIG. 5, the network side transmits downlink data in a point-to-multipoint transmission mode within the area of the broadcast service. The terminal in this area may receive broadcast data through the broadcast channel. For example, the broadcast service in FIG. 5 is initiated by the service layer of the AF and notified to the PCF entity, then the PCF entity selects the corresponding SMF or AMF entity; a corresponding service establishment request (or service modification request) is transmitted to the SMF entity through the N7 channel; and after selecting the RAN and/or UPF, the SMF entity transmits the broadcast service to the RAN node through the AMF entity.

With the above solutions, the terminal service is able to switch from the present first service to the second service in combination with the situation of the terminal device. Therefore, the terminal may realize switching between services when a certain condition is met, thereby ensuring the continuity of services on the terminal side.

Figure 6A:
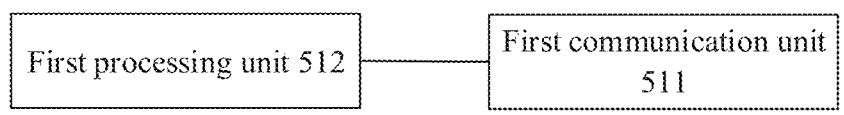
FIG. 6A is a schematic structure diagram of a terminal according to an embodiment of the present disclosure.

An embodiment of the present disclosure provides a terminal, as illustrated in FIG. 6A, which includes a first communication unit 511.

The first communication unit 511 is configured to switch, when data of a first service is received, to receive data of a second service through the terminal responsive to determining that a preset condition is met.

The preset condition includes at least one of: a condition for the terminal to stop the first service, or a condition for the terminal to receive the data of the second service.

Figure 6B:
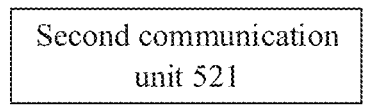
FIG. 6B is a schematic structure diagram of a network device according to an embodiment of the present disclosure.

An embodiment of the present disclosure further provides a network device, as illustrated in FIG. 6B, which includes a second communication unit 521.

The second communication unit 521 is configured to transmit data of a first service to a terminal device and transmit data of a second service to the terminal device when the terminal device switches from the first service to the second service.

The embodiments of the present disclosure may be applied to a 5G system. Specifically, the terminal may be a terminal device in a 5G network, or may be a terminal supporting 5G. The network device may be a core network device, a RAN node, or the like.

The solutions provided by the embodiments are described in detail below in two examples.

First Example

The abovementioned first service is a broadcast service, and the second service is a unicast service. Accordingly, this situation is mainly for a processing of switching from a broadcast mode to a unicast mode. The following is described in detail.

In the present example, the terminal receives the data of the first service, which may be understood as that the terminal is receiving the broadcast service, or the terminal is receiving downlink data of the broadcast service.

The terminal may further include a first processing unit 512. The first processing unit 512 is configured to determine to switch from the broadcast service to the unicast service based on the preset condition.

In the present example, the preset condition mainly includes a condition for the terminal to stop the first service.

Specifically, in the present example, the preset condition includes at least one of the following.

The terminal detects moving out of a coverage area of the broadcast service.

The terminal detects moving out of a coverage area of the broadcast service after a first duration.

The terminal receives notification information that the broadcast service is stopped after a second duration.

Based on the abovementioned detection, the terminal may determine to switch from reception of data of the first service (the broadcast service in the example) to reception of data of the second service (the unicast service in the example). Correspondingly, the first communication unit 511 is configured to initiate establishment of a PDU session based on related information of a PDU session to be established for the unicast service.

Specifically, the operation that the terminal determines the related information of the PDU session to be established for the unicast service may include the following manners.

In the first manner, a NAS determines related information of the PDU session to be established according to first indication information of an AS and information of a preconfigured URSP. The PDU session is a PDU session of the unicast service.

In the second manner, an NAS of the terminal determines related information of a PDU session to be established according to second indication information of an application layer and information of a preconfigured URSP. The PDU session is a PDU session of the unicast service. The second indication information is used to trigger the NAS to establish the PDU session.

The application layer of the terminal acquires the third indication information of the AS.

The third indication information is used to indicate that the broadcast service has stopped or is to stop.

Further, based on the above description, when the first communication unit 511 receives DRB configuration of the PDU session, the terminal stops reception of the broadcast service. Correspondingly, the second communication unit 521 of the network device receives information that reception of the broadcast service is stopped from the terminal device.

Second Example

The present example is different from the above first example in that the first service is the unicast service and the second service is the broadcast service in the present example. Further, the broadcast service in the present example may be a broadcast service that is being transmitted using a unicast bearer. That is, the present example is directed to a unicast-to-broadcast switching procedure and a processing of a service switching in which a terminal moves to the coverage area of the broadcast.

In the present embodiment, the terminal transmits one or more services through the unicast in an area without broadcast coverage, and when the terminal detects that the broadcast service exists, the terminal notifies the network to release the corresponding unicast connection. The present example will be described in detail.

When the first processing unit 512 of the terminal detects the broadcast service, it is determined that the preset condition is met, or when the terminal further determines that the detected broadcast service is being transmitted using the unicast bearer, the preset condition is met. Then, the terminal determines to switch from the unicast service to the broadcast service. That is, in the present example, the preset condition includes that presence of the broadcast service is detected by the terminal.

The preset condition specifically includes at least one of the following.

The access stratum of the terminal detects that the signal intensity of the broadcast channel related to the unicast service is higher than a preconfigured third threshold.

The access stratum of the terminal detects that the reception block error ratio of the broadcast channel related to the unicast service is lower than a preconfigured fourth threshold.

The terminal receives system information that supports the broadcast service related to the unicast service.

The terminal is capable of receiving data on the broadcast channel.

The first processing unit 512 of the terminal may instruct the AS to monitor the broadcast service at the NAS. That is, the AS monitors the broadcast service according to an indication of the NAS.

Further, information of the broadcast service that needs to be acquired for monitoring the broadcast service may be acquired through the following manners.

The access stratum of the terminal receives information of the broadcast service corresponding to a bearer of the unicast service from the NAS during a bearer establishment procedure of the unicast service.

Alternatively, the AS of the terminal acquires information of the broadcast service corresponding to the unicast service from a configuration message on the network side. The configuration message on the network side may also be acquired by the AS of the terminal during the bearer establishment procedure of the unicast service, or may be preconfigured, or may be acquired from other processing procedures, which is not exhaustive herein.

In the second manner, the first processing unit 512 is configured to detect any broadcast service according to at least one of the above preset conditions at the access stratum.

After the related broadcast service is detected, the first communication unit 511 of the terminal is configured to instruct the network to release or deactivate the unicast service.

Specifically, in Manner A, the NAS of the first communication unit 511 of the terminal is configured to initiate, according to fourth indication information of an AS, releasing or deactivating of a PDU session connection corresponding to the unicast service.

The fourth indication information is used to instruct to: release or deactivate the PDU session corresponding to the unicast service, or, detect related information of the broadcast service. The related information of the broadcast service may be a PDU session connection corresponding to the broadcast service.

When the network device is a core network device, the second communication unit is configured to notify, according to a processing of releasing or deactivating a PDU session connection corresponding to the unicast service initiated by the NAS of the terminal, a RAN node to release the PDU session connection corresponding to the unicast service.

The second communication unit is configured to notify the RAN node to release AN resources and context information of the PDU session connection corresponding to the unicast service.

In Manner B, the first communication unit of the terminal is configured to initiate a processing of releasing or deactivating a PDU session connection corresponding to the unicast service to the core network through the NAS according to fifth indication information of the application layer. The fifth indication information is used to indicate related information of the broadcast service.

Correspondingly, the second communication unit of the core network device is configured to notify the RAN node to release the PDU session connection corresponding to the unicast service according to the processing of releasing or deactivating the PDU session connection corresponding to the unicast service initiated by the NAS of the terminal.

The second communication unit of the core network device is configured to notify the RAN node to release AN resources and context information of the PDU session connection corresponding to the unicast service.

In Manner C, the first communication unit of the terminal is configured to transmit sixth indication information to a RAN node through the AS.

The sixth indication information includes DRB information corresponding to a unicast service requested to be released or PDU session information corresponding to the unicast service requested to be released.

Specifically, when the network device is a RAN node, the second communication unit 521 of the RAN node is configured to receive the sixth indication information from the terminal.

When the sixth indication information includes DRB information corresponding to a unicast service requested to be released, or PDU session information corresponding to the unicast service requested to be released, the second communication unit 521 of the RAN node is configured to release the DRB and related configuration corresponding to the requested DRB or PDU session.

And/or, when the sixth indication information includes related information of a detected broadcast service or information of a detected broadcast service in which a unicast bearer exists, the second communication unit 521 of the RAN node is configured to release a DRB and related configuration corresponding to the unicast service. That is, when the terminal indicates information of a service, the RAN releases the DRB and related configuration corresponding to the service.

And/or, when the sixth indication information includes a measurement result of a broadcast channel corresponding to a detected broadcast service, the second communication unit 521 of the RAN node is configured to determine whether to release a unicast bearer according to the measurement result. That is, the terminal may report the result of the detected broadcast channel to the RAN, and correspondingly, the RAN determines whether to release the unicast bearer according to the result. For example, when the measurement result indicates that quality of the present unicast service exceeds a preset quality threshold (for example, SIRN is higher than the corresponding threshold), the bearer corresponding to the unicast service may not be released; otherwise, it may be determined to release the bearer corresponding to the unicast service, and then the bearer of the broadcast service corresponding to the unicast service is established.

In addition, during a bearer establishment procedure of the unicast service, the RAN node receives broadcast service information corresponding to an indication from the core network.

The first communication unit of the terminal switches from the unicast service to the broadcast service. Then, the terminal establishes the broadcast service.

With the above solutions, the terminal service is able to switch from the present first service to the second service in combination with the situation of the terminal device. Therefore, the terminal may realize switching between services when a certain condition is met, thereby ensuring the continuity of services on the terminal side.

Figure 7:
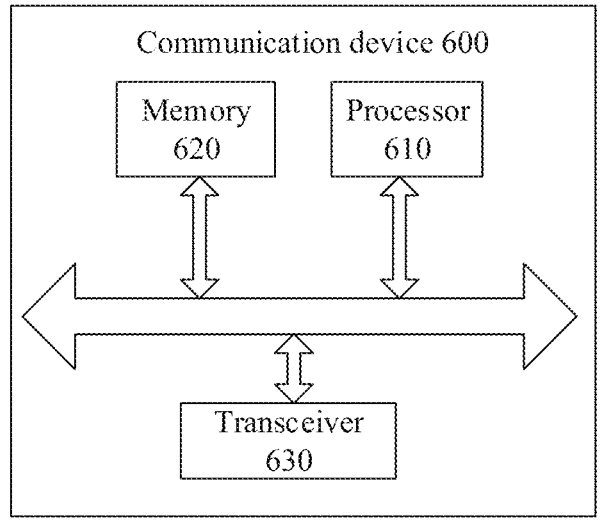
FIG. 7 is a schematic structure diagram of a communication device according to an embodiment of the present disclosure.

FIG. 7 is a schematic structure diagram of a communication device 600 according to an embodiment of the present disclosure, and the device may be the abovementioned terminal device according to the embodiment. The terminal illustrated in FIG. 7 includes a processor 610. The processor 610 may call a computer program from a memory and run the computer program to implement the method in the embodiments of the present disclosure.

In one example, as illustrated in FIG. 7, a memory 620 may also be included. The processor 610 may call a computer program from the memory 620 and run the computer program to implement the method in the embodiments of the present disclosure.

The memory 620 may be a separate device from the processor 610, or may be integrated into the processor 610.

In one example, as illustrated in FIG. 7, the communication device 600 may also include a transceiver 630. The processor 610 may control the transceiver 630 to communicate with another device, specifically, to transmit information or data to another device, or receive information or data from another device.

The transceiver 630 may include a transmitter and a receiver. The transceiver 630 may further include one or more antennas.

In one example, the communication device 600 may specifically be the terminal or network device in the embodiments of the present disclosure. The communication device 600 may implement corresponding processes implemented by the network device in each method of the embodiments of the present disclosure, which will not be elaborated herein for brief description.

In one example, the communication device 600 may specifically be the terminal or network device in the embodiments of the present disclosure. The communication device 600 may implement corresponding processes implemented by the mobile terminal/terminal/network device in each method of the embodiments of the disclosure, which will not be elaborated herein for brief description.

Figure 8:
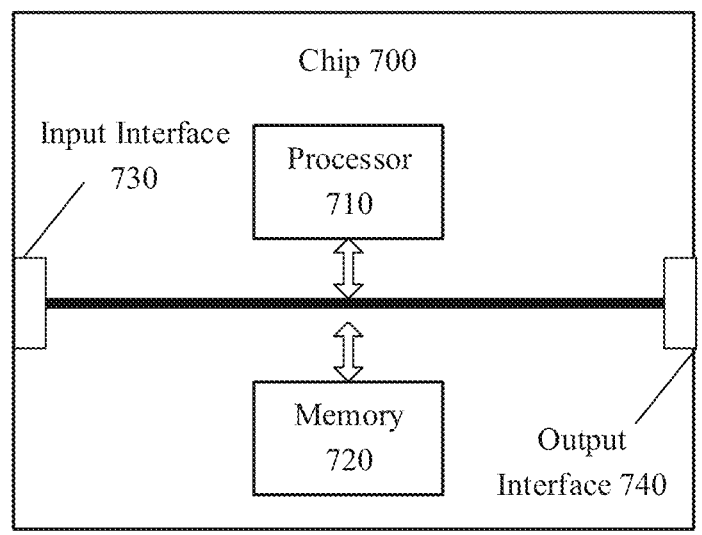
FIG. 8 is a schematic block diagram of a chip according to an embodiment of the present disclosure.

FIG. 8 is a schematic structure diagram of a chip according to an embodiment of the present disclosure. The chip 700 illustrated in FIG. 8 includes a processor 710. The processor 710 may call a computer program from a memory and run the computer program to implement the method in the embodiments of the present disclosure.

In one example, as illustrated in FIG. 8, the chip 700 may also include a memory 720. The processor 710 may call a computer program from the memory 720 and run the computer program to implement the method in the embodiments of the present disclosure.

The memory 720 may be a separate device from the processor 710, or may be integrated in the processor 710.

In one example, the chip 700 may also include an input interface 730. The processor 710 may control the input interface 730 to communicate with another device or chip, and specifically, may acquire information or data transmitted by another device or chip.

In one example, the chip 700 may also include an output interface 740. The processor 710 may control the output interface 740 to communicate with another device or chip, and specifically, may output information or data to another device or chip.

In one example, the chip may be applied to the network device in the embodiments of the present disclosure. The chip may implement corresponding processes implemented by the network device in each method of the embodiments of the disclosure, which will not be elaborated herein for brief description.

In one example, the chip may be applied to the terminal device in the embodiments of the present disclosure. The chip may implement corresponding processes implemented by the terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It may be understood that the memory in the embodiments of the disclosure may be a volatile memory or a non-volatile memory, or may include both the volatile and non-volatile memories. The non-volatile memory may be an ROM, a PROM, an EPROM, an EEPROM, or a flash memory. The volatile memory may be an RAM, which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other proper types.

The embodiments of the disclosure also provide a computer readable storage medium for storing a computer program.

In one example, the computer-readable storage medium may be applied to the network device of the embodiments of the disclosure. The computer program may enable a computer to perform the corresponding processes implemented by the network device in each method of the embodiments of the disclosure, which will not be elaborated herein for brief description.

In one example, the computer-readable storage medium may be applied to the terminal device of the embodiments of the disclosure. The computer program may enable a computer to perform the corresponding processes implemented by the mobile terminal/terminal device in each method of the embodiments of the disclosure, which will not be elaborated herein for brief description.

The embodiments of the disclosure also provide a computer program product. The computer program product includes a computer program instruction.

In one example, the computer program product may be applied to the network device of the embodiments of the disclosure. The computer program instruction may enable a computer to perform the corresponding processes implemented by the network device in each method of the embodiments of the disclosure, which will not be elaborated herein for brief description.

In one example, the computer program product may be applied to the mobile terminal/terminal device of the embodiments of the disclosure. The computer program instruction may enable a computer to perform the corresponding processes implemented by the mobile terminal/terminal device in each method of the embodiments of the disclosure, which will not be elaborated herein for brief description.

The embodiments of the disclosure also provide a computer program.

In one embodiment, the computer program may be applied to the network device of the embodiments of the disclosure. The computer program, when running in a computer, enables the computer to perform the corresponding processes implemented by the network device in each method of the embodiments of the disclosure, which will not be elaborated herein for brief description.

In one example, the computer program may be applied to the mobile terminal/terminal device of the embodiments of the disclosure. The computer program, when running in a computer, enables the computer to perform the corresponding processes implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware and software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for service switching between a broadcast service and a unicast service, comprising:
when a terminal receives data of a first service and the first service is the broadcast service, switching, by the terminal responsive to determining that a preset condition is met, to receive data of a second service, wherein the second service is the unicast service;
wherein the preset condition comprises at least one of:
a condition for the terminal to stop the first service, or a condition for the terminal to receive the data of the second service;
wherein the method further comprises:
determining, by a Non Access Stratum (NAS) of the terminal, related information of a Protocol Data Unit (PDU) session to be established according to information of a preconfigured UE Route Selection Policy (URSP) and one of first indication information of an Access Stratum (AS) and second indication information of an application layer, wherein the PDU session is a PDU session of the unicast service.

2. The method of claim 1, wherein the preset condition further comprises at least one of:
detecting, by the terminal, moving out of a coverage area of the broadcast service;
detecting, by the terminal, moving out of a coverage area of the broadcast service after a first duration; or
receiving, by the terminal, notification information for indicating that the broadcast service is stopped after a second duration.

3. The method of claim 2, wherein the second indication information is used to trigger the NAS to establish the PDU session.

4. The method of claim 3, further comprising:
acquiring, by the application layer of the terminal, third indication information of the AS;
wherein the third indication information is used to indicate that the broadcast service has stopped or is to stop.

5. The method of claim 1, wherein when the first service is the unicast service, and the second service is the broadcast service, the preset condition comprises: presence of the broadcast service is detected by the terminal.

6. The method of claim 5, further comprising:
initiating, by the NAS of the terminal according to fourth indication information of the AS, a processing of releasing or deactivating a PDU session connection corresponding to the unicast service to a core network, or, requesting to delete Quality of Service (QOS) data flow corresponding to the unicast service;
wherein the fourth indication information is used to instruct to: release or deactivate the PDU session corresponding to the unicast service, or, detect related information of the broadcast service, or, delete the QoS data flow corresponding to the unicast service.

7. The method of claim 5, further comprising:
initiating, by the NAS of the terminal according to fifth indication information of an application layer, a processing of releasing or deactivating a PDU session connection corresponding to the unicast service to a core network, wherein the fifth indication information is used to indicate related information of the broadcast service.

8. The method of claim 5, further comprising:
transmitting, by the AS of the terminal, sixth indication information to a Radio Access Network (RAN) node;
wherein the sixth indication information comprises one of: Data Radio Bearer (DRB) information corresponding to a unicast service requested to be released, PDU session information corresponding to a unicast service requested to be released or deactivated, or QoS data flow information corresponding to a unicast service requested to be deleted.

9. A terminal, comprising:
a first transceiver, configured to switch, when data of a first service is received and the first service is the broadcast service, to receive data of a second service through the terminal responsive to determining that a preset condition is met, wherein the second service is the unicast service;

wherein the preset condition comprises at least one of:

a condition for the terminal to stop the first service, or a condition for the terminal to receive the data of the second service;

wherein a Non Access Stratum (NAS) of the terminal is configured to determine related information of a Protocol Data Unit (PDU) session to be established according to information of a preconfigured UE Route Selection Policy (URSP) and one of first indication information of an Access Stratum (AS) and second indication information of an application layer, wherein the PDU session is a PDU session of the unicast service.

10. The terminal of claim 9, wherein the preset condition further comprises at least one of:

detecting moving out of a coverage area of the broadcast service;

detecting moving out of a coverage area of the broadcast service after a first duration; or receiving notification information for indicating that the broadcast service is stopped after a second duration.

11. The terminal of claim 10, wherein the second indication information is used to trigger the NAS to establish the PDU session.

12. The terminal of claim 9, wherein when the first service is a unicast service, and the second service is a broadcast service, the preset condition comprises: presence of the broadcast service is detected by the terminal.

13. The terminal of claim 12, further comprising:

a first processor, configured to initiate, according to fourth indication information of the AS through the first transceiver at the NAS, a processing of releasing or deactivating a PDU session connection corresponding to the unicast service to a core network, or, request to delete Quality of Service (QOS) data flow corresponding to the unicast service;

wherein the fourth indication information is used to instruct to: release or deactivate the PDU session corresponding to the unicast service, or, detect related information of the broadcast service, or, delete the QoS data flow corresponding to the unicast service.

14. The terminal of claim 12, wherein the first transceiver is configured to initiate, according to fifth indication information of an application layer, a processing of releasing or deactivating a PDU session connection corresponding to the unicast service to a core network at the NAS, wherein the fifth indication information is used to indicate related information of the broadcast service.

15. The terminal of claim 12, wherein the first transceiver is configured to transmit sixth indication information to a Radio Access Network (RAN) node at the AS;

wherein the sixth indication information comprises one of: Data Radio Bearer (DRB) information corresponding to a unicast service requested to be released, PDU session information corresponding to a unicast service requested to be released or deactivated, or QoS data flow information corresponding to a unicast service requested to be deleted.

* * * * *